US012667978B2

(12) United States Patent
Vietri

(10) Patent No.: US 12,667,978 B2
(45) Date of Patent: Jun. 30, 2026

(54) APPARATUS FOR HOLDING AND DISCHARGING DRUMS

(71) Applicant: CSV Life Science Group S.r.l., Milan (IT)

(72) Inventor: Luca Vietri, Milan (IT)

(73) Assignee: CSV Life Science Group S.r.l., Milan (IT)

( * ) Notice: Subject to any disclaimer, the term of this patent is extended or adjusted under 35 U.S.C. 154(b) by 1020 days.

(21) Appl. No.: 17/846,091

(22) Filed: Jun. 22, 2022

(65) Prior Publication Data

US 2023/0018099 A1     Jan. 19, 2023

(30) Foreign Application Priority Data

Jun. 22, 2021     (IT) ........................ 102021000016397

(51) Int. Cl.
B25J 15/00          (2006.01)
(52) U.S. Cl.
CPC ....... B25J 15/0023 (2013.01); B25J 15/0038 (2013.01)
(58) Field of Classification Search
CPC .. B25J 15/0023; B25J 15/0038; B08B 15/026
See application file for complete search history.

(56) References Cited

FOREIGN PATENT DOCUMENTS

| CN | 103899772 A | * | 7/2014 | ............. F16K 1/221 |
| DE | 1 033 979 | | 7/1958 | |
| DE | 102014001117 A1 | * | 7/2015 | .............. B08B 5/02 |
| EP | 2875263 B1 | * | 5/2017 | ............. B63B 71/00 |
| EP | 3 479 913 A1 | | 5/2019 | |
| IT | RE20080083 A1 | * | 12/2008 | .............. B30B 9/22 |
| KR | 20200074793 A | * | 6/2020 | ............ B25J 9/0009 |

OTHER PUBLICATIONS

CSV Containmentnews: Fully Automated Drum Unloading Machine:, Oct. 11, 2017, URL: https://www.youtube.com/watch?v=ojWy6Y8s7Kl See Italian Search.
CSV Containmentnews: "CSV Containment—Drum Reactor Chargin DRC XS", Jan. 8, 2020, URL: https://www.youtube.com/watch?v=bJ1YLXcBX1s See Italian Search.
Italian Search Report Corresponding to 202100016397 mailed Mar. 21, 2022.

* cited by examiner

*Primary Examiner* — Stephen A Vu
(74) *Attorney, Agent, or Firm* — Secant IP, P.L.L.C.

(57) ABSTRACT

An apparatus for holding and discharging drums (6) comprises an interface device comprising an open cylindrical tubular element (2) with its opposite ends (2a, 2b) closed by respective diaphragm closures (3, 4) having a respective first portion (3a, 4a) firmly fixed to said cylindrical tubular element (2) by quick-release fixation means (8) through changes in internal pneumatic pressure.

13 Claims, 7 Drawing Sheets

APPARATUS FOR HOLDING AND DISCHARGING DRUMS

FIELD OF THE INVENTION

The present invention refers to an interface device for an apparatus for holding and discharging drums, designed for use in combination with an apparatus for holding and discharging drums.

In a further aspect, the present invention also relates to an apparatus for holding and discharging drums.

BACKGROUND OF THE INVENTION

Interface devices for an apparatus for holding and discharging drums, comprises interfaces for holding and coupling drums, are used, for example in the chemical, pharmaceutical and food industries, in which drums containing active, harmful and/or toxic substances, should be opened while both avoiding contamination of the environment, and contamination of the substances by the environment, and hence avoiding exposure of the substances to the atmosphere and to the operator in charge of discharging the material in the drums.

Such problem of contamination or dispersion of substances into the environment can arise in the chemical or pharmaceutical industries, for example in the production of active ingredients for pharmaceutical use or for chemical synthesis, or in the production of finished products such as tablets, capsules, sachets, etc., with drums being opened inside rigid or flexible isolation chambers.

The packaged material may be required to be opened for a number of reasons, such as to sample materials, e.g., materials received from storage, raw materials and intermediates which are quarantined pending the outcome of sampling, and/or during weighing and dispensing of amounts of materials required for production according to preset production recipes.

Contamination and dispersion are avoided by means of the aforementioned interface devices, which use valves that can adapt, within certain limits, to the size of the cylindrical drums.

It should be noted that if the interface device for an apparatus for holding and discharging drums needs to be cleaned up, for example due to a change in the production and treated material, cleaning and washing operations are complicated in consideration of the deformable structure thereof.

In addition, any washing operation requires the achievement of a positively dried condition before any contact with the new powder.

On the other hand, the possibility of removing diaphragm closures for easier cleanup is not well accepted by operators due to the time required and the difficulties encountered during dismantling, which generally leads to fairly long downtime and requires the work of specially skilled operators.

In view of these problems, a strong need is felt of being able to easily clean and/or replace the diaphragm closures mounted on board an interface device for an apparatus for holding and discharging drums, to thereby reduce the time and staff required in case of a change of discharged product.

SUMMARY OF THE INVENTION

This invention is based on the problem of providing an interface device for an apparatus for holding and discharging drums which has such structural and functional characteristics as to fulfill the above need, while obviating the above prior art drawbacks.

This problem is solved by an interface device for an apparatus for holding and discharging drums as defined in the independent claim(s).

In a further aspect, the problem is solved by an apparatus for holding and discharging drums as defined in the independent claim(s).

DESCRIPTION OF THE DRAWINGS

Further features and advantages of the present invention will be apparent from the following description of a few preferred embodiments thereof, which are given by way of illustration and without limitation with reference to the accompanying figures, in which.

DETAILED DESCRIPTION OF THE INVENTION

Figure 1:
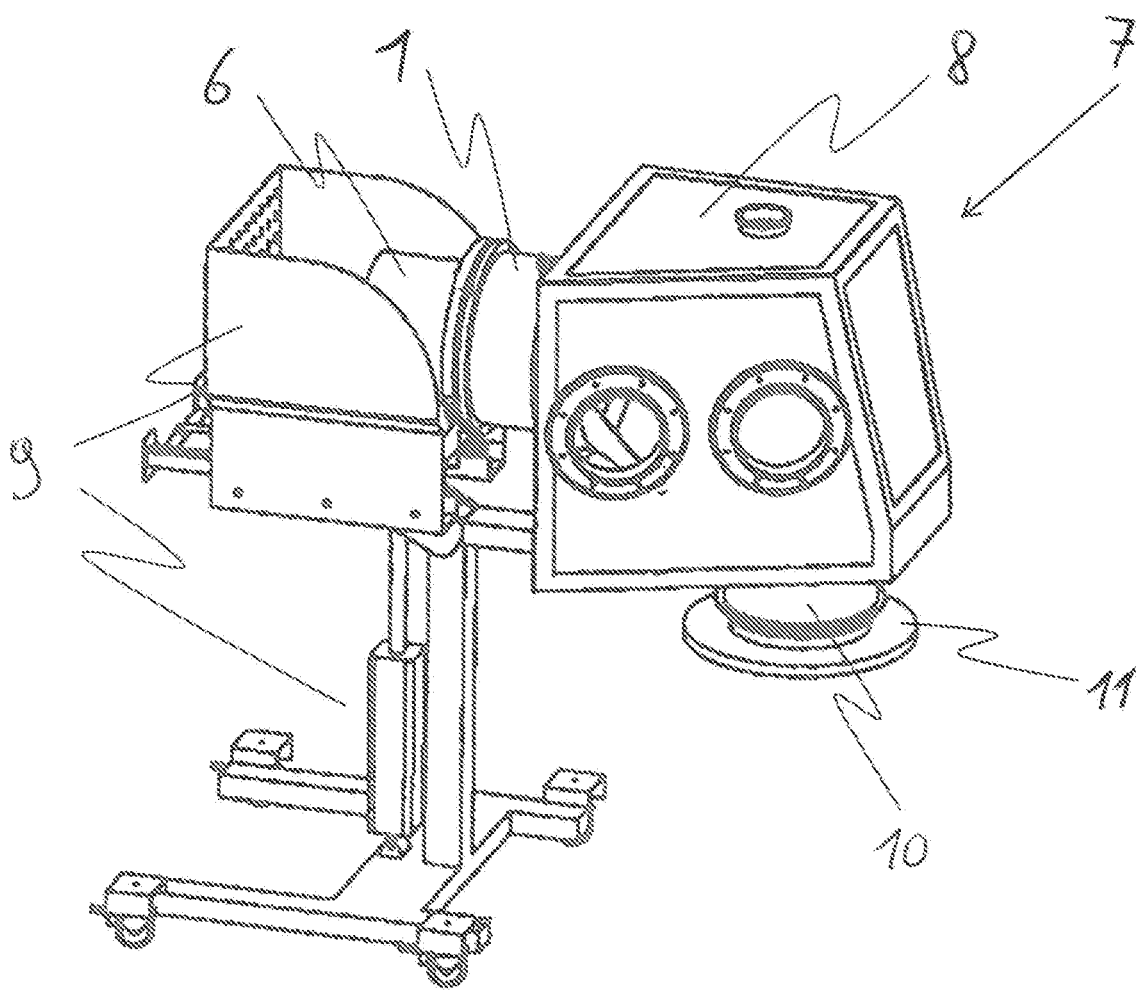
FIG. 1 shows a simplified perspective view of an apparatus for holding and discharging drums which comprises an interface device of the present invention.
Figure 2:
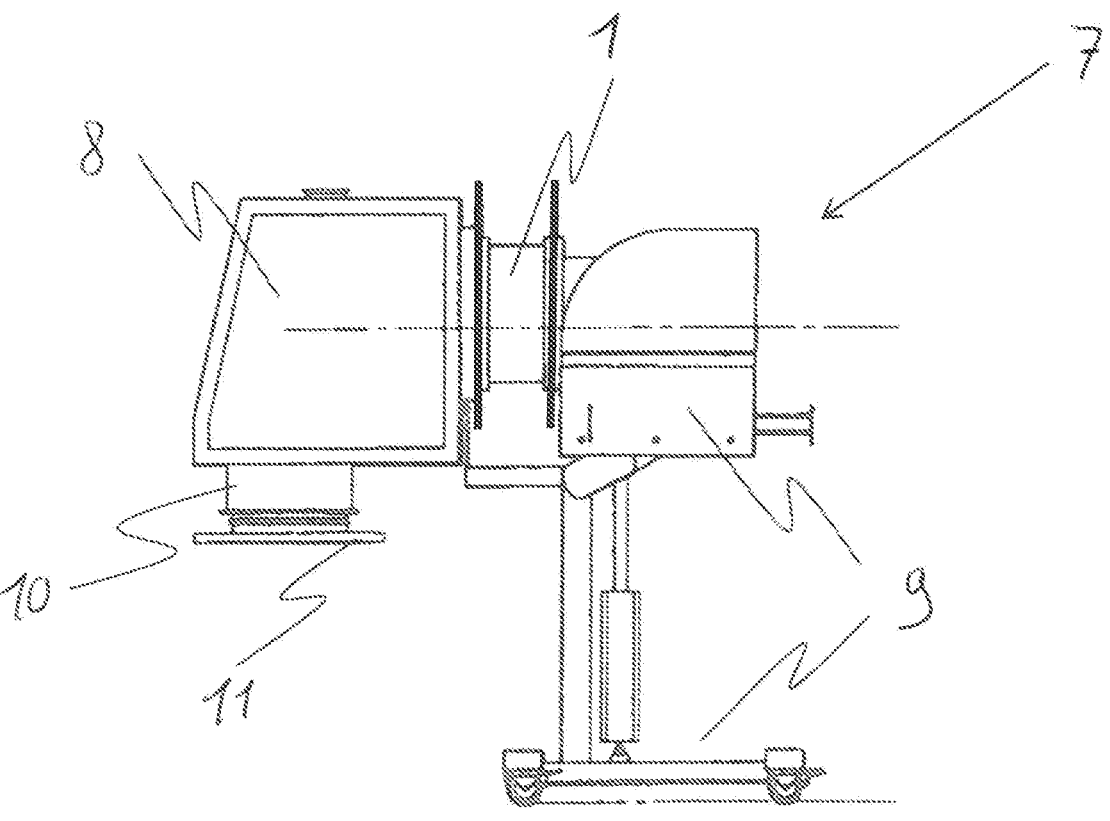
FIG. 2 shows a lateral plan view of the apparatus of FIG. 1.

Referring to the accompanying figures, 7 generally designates an apparatus for holding and discharging cylindrical drums, which comprises an isolator 8, an interface device 1 for loading and discharging cylindrical drums 6 and a coupling device with a loading point 10.

Preferably, the aforementioned isolator 8 is formed with openings having gloves sealingly connected with the body of such isolator 8, whereby actions may be made from outside the isolator 8 on what is contained therein, with no risk of spillage of substances and no risk of contamination from the environment and from the substances within the closed volume of the isolator.

Preferably, the aforementioned loading point 10 of the coupling device comprises a flange or a hatch 11 for interfacing with other parts of a plant (not shown).

Preferably, the aforementioned apparatus 7 comprises a drum-lifting and turning device 9 which is driven by the interface device 1 to allow cylindrical drums 6 to be loaded into such interface device 1.

The aforementioned interface device 1 for apparatus for holding and discharging drums comprises (see FIGS. 3 and 4):

a cylindrical tubular element 2 with a fixed longitudinal axis X-X having opposite open ends, respectively a first end 2a and a second end 2b; said first end 2a of said cylindrical tubular element 2 facing the aforementioned isolator 8, and said end 2b of said cylindrical tubular element 2 facing an environment outside said isolator 8 and being used as an end for loading and discharging cylindrical drums 6 into/from the cylindrical tubular element 2;

a first closure 3 located proximate to said first end 2a, and a second closure 4 located proximate to said second end 2b.

Preferably, the aforementioned closures 3, 4 are diaphragm closures, also known as iris closures, including:

a respective first portion 3a, 4a rigidly joined to said cylindrical tubular element 2 by releasable fixation means 8, so that each closure 3, 4 can be released and removed from the cylindrical tubular element 2 and replaced as needed, and a second rigidly joined portion connected to an operating member 5 to be driven in rotation allow the closure to move between a closed state and an open state.

Hence each of these closures 3, 4 can be operated to reversibly move from a closed state to an open state in which it respectively shuts and clears the passage defined by its respective end 2a, 2b with which the closure is associated.

According to the illustrated embodiment, each closure has an operating member 3, 4, associated therewith, here an operating wheel 5, which may be operated to drive its respective closure 3, 4 toward the open position or the closed position.

Namely, each closure has the aforementioned second portion kinematically coupled to its respective operating member to be driven thereby to the open/closed position, wherefore by rotating a wheel 5 relative to the cylindrical tubular element 2, the movable part of the closure 3, 4 associated with that operating wheel will be rotated in the opening/closing direction.

Preferably, the rotation of the movable part of the closures 3, 4 and their respective operating wheels 5 is guided by suitable slide guides 7 of the cylindrical tubular element 2.

Figure 3:
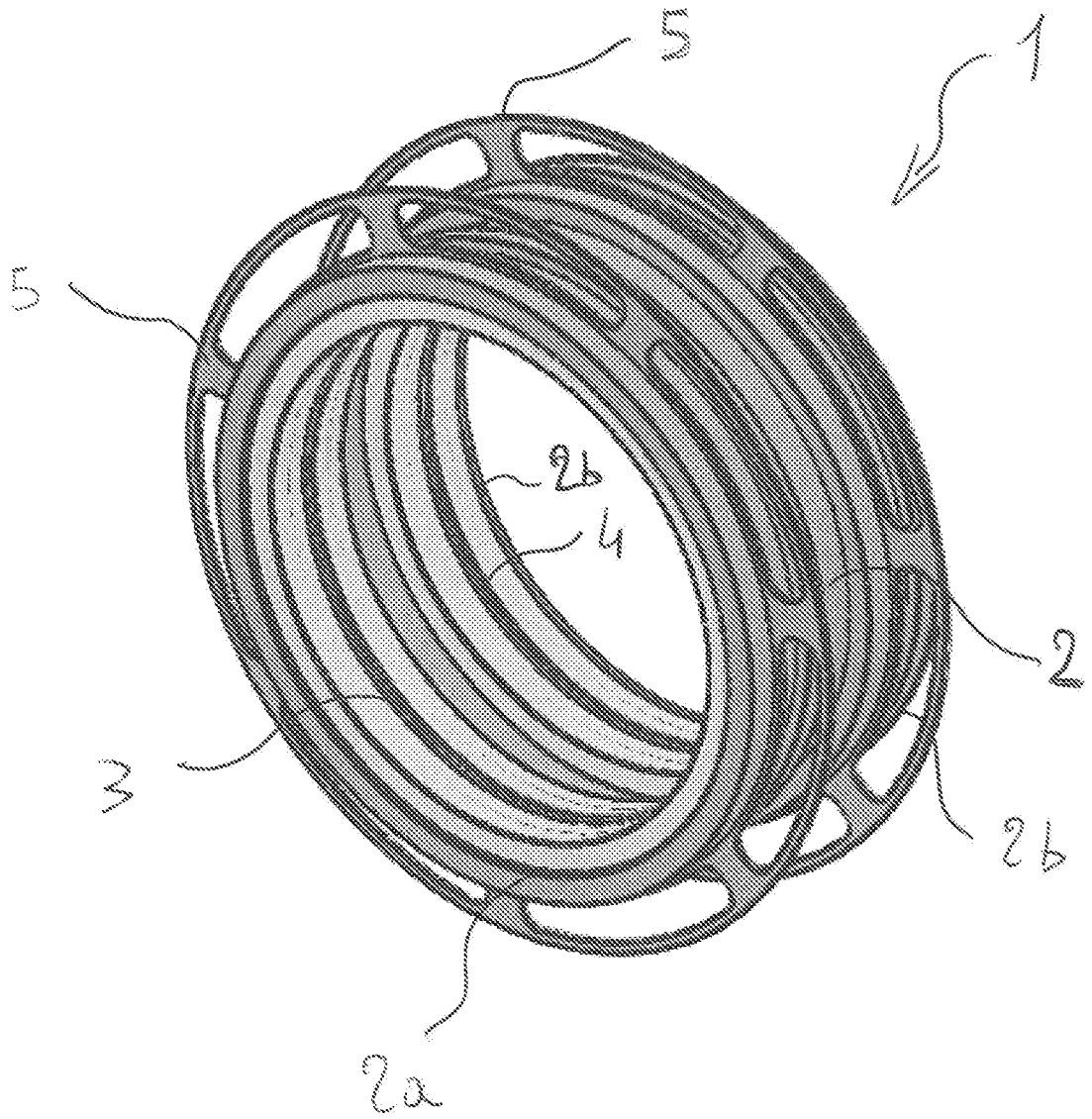
FIG. 3 shows a simplified perspective view of the interface device of the present invention.
Figure 4:
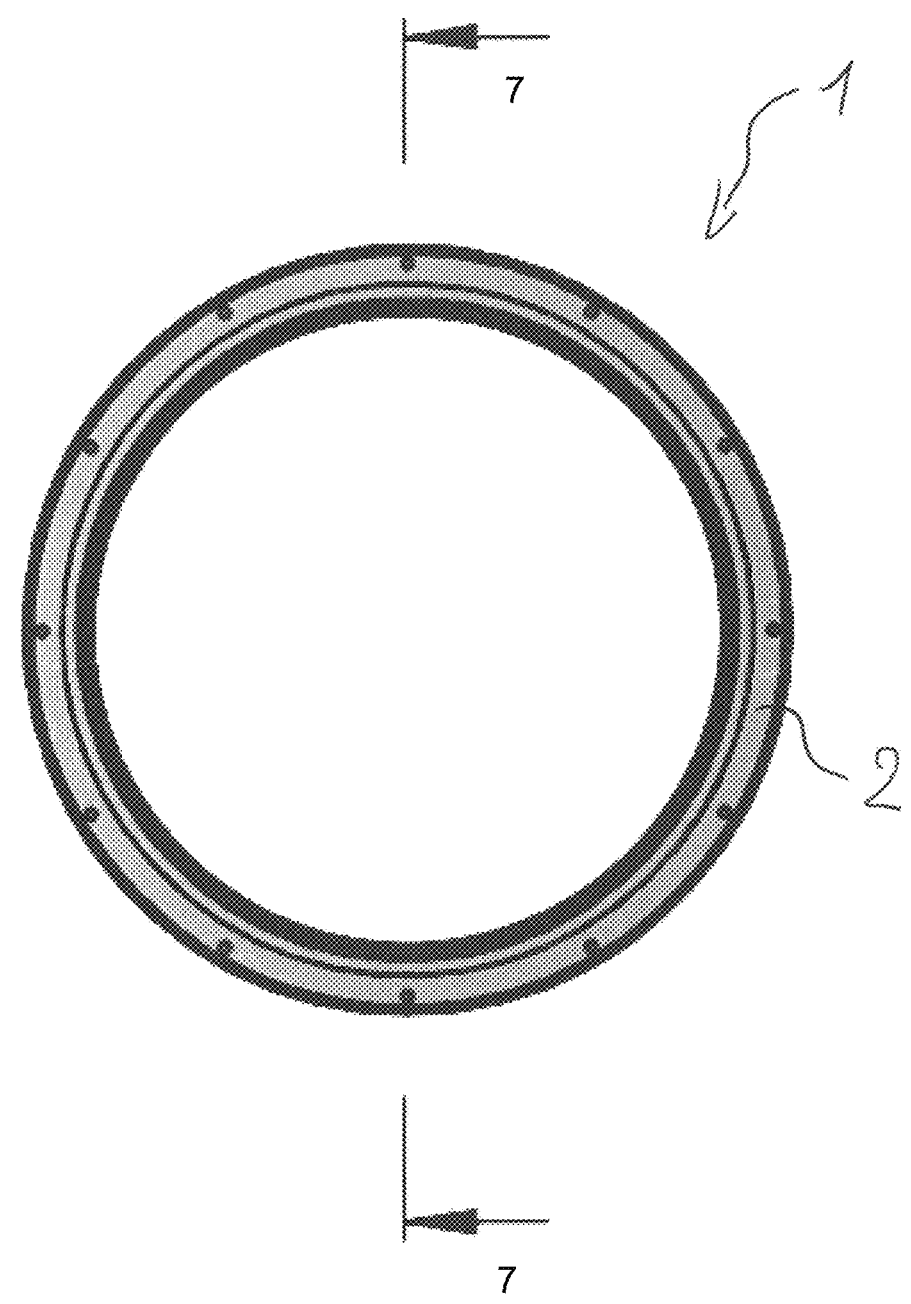
FIG. 4 shows a front view of the interface device of FIG. 3.
Figure 5:
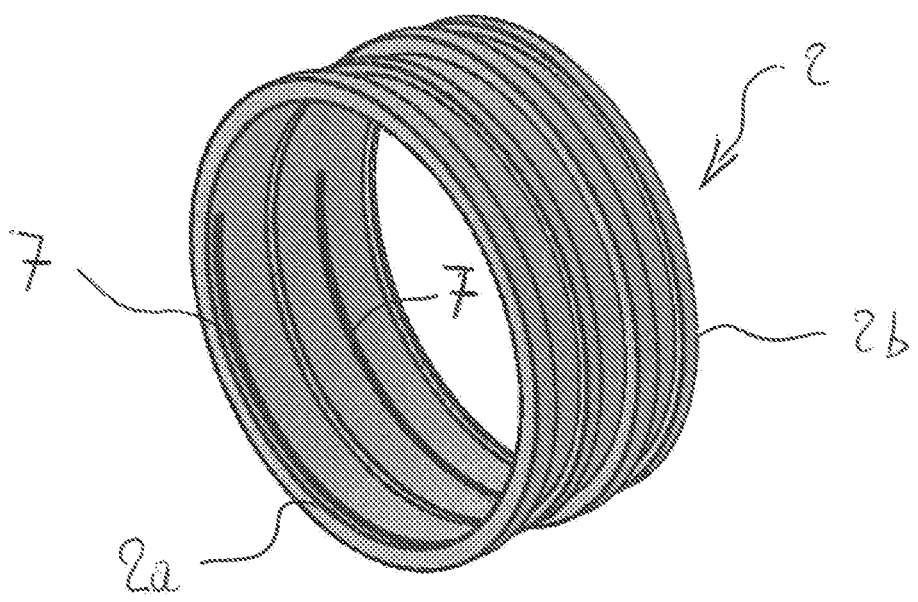
FIG. 5 is a perspective view of the cylindrical tubular element of the interface device of FIG. 3.
Figure 6:
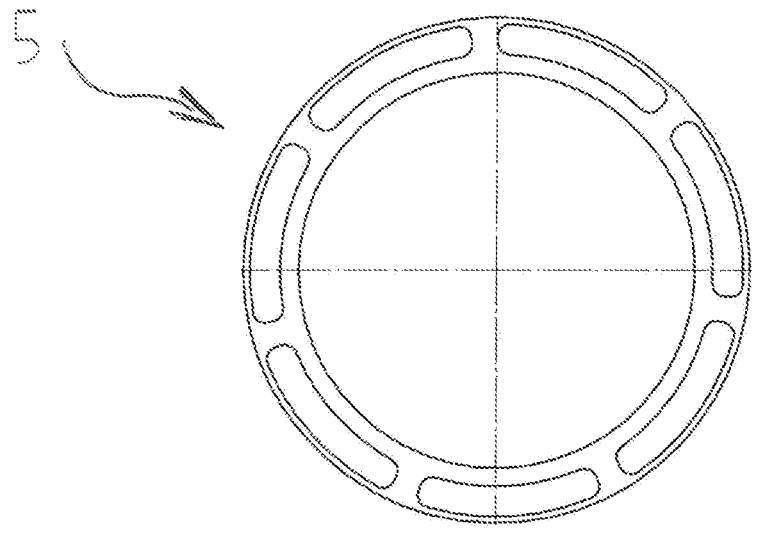
FIG. 6 shows a front plan view of an operating wheel for a closure of the interface device as shown in FIG. 3.

According to the embodiment of FIG. 3, the aforementioned slide guides 7 are defined by grooves circumferentially formed in the interior surface of the side wall of the cylindrical tubular element 2.

It should be noted that while the closures can be driven to the open and closed positions by the provision of the above-discussed control wheels 5, this may be also achieved using other mechanical devices such as levers, linkages and the like. Also, the closures 3, 4 may be driven to the open and closed positions by manual means or, when needed, in a conveniently automated manner, by the provision of appropriate drive and control means.

Advantageously, according to the invention, the aforementioned releasable fixation means are quick-release fixation means 8.

Preferably, the aforementioned quick-release fixation means 8 are pneumatically, hydraulically and/or mechanically operated.

Preferably, the aforementioned quick-release fixation means 8 shall comprise elements 12 that can be deformed and/or inflated/deflated by increasing or decreasing pneumatic or hydraulic pressure, or by deforming or changing the configurations of mechanical parts.

In particular, the aforementioned quick-release fixation means may be elastically deformable and/or adapted to undergo changes in the configuration/geometry of mechanical parts, for example by the use of articulated systems or other mechanisms/devices having mutually movable parts with screw and nut or rack and pinion assemblies, coupling between sliding parts and the like. Preferably, the interface device 1 comprises pneumatic, hydraulic and/or mechanical actuators to achieve the actuation of these quick-release fixation means 8.

Preferably, the aforementioned deformable and/or inflatable/deflatable elements comprise an inflatable tubular element 12, which is susceptible to reversibly change, by inflation or deflation, from a smaller-volume contracted state, to a larger-volume expanded configuration. In this larger-volume expanded configuration each inflatable tubular element 12 directly or indirectly acts to attach the aforementioned first portion 3a, 4a of the aforementioned closures 3, 4 to the interior surface of the side wall of the cylindrical tubular element 2.

Preferably, the aforementioned deformable and/or inflatable/deflatable elements 12 are at least partially accommodated in seats 9 formed in the interior surface of the side wall of said cylindrical tubular element 2, and in said larger-volume configuration said deformable and/or inflatable/deflatable elements 12 radially project toward the center of said cylindrical tubular element 2 to act in the radial direction and cause the first portions 3a, 4a of their respective closures 3, 4 to be rigidly joined to the interior surface of the cylindrical tubular element 2.

Figure 7:
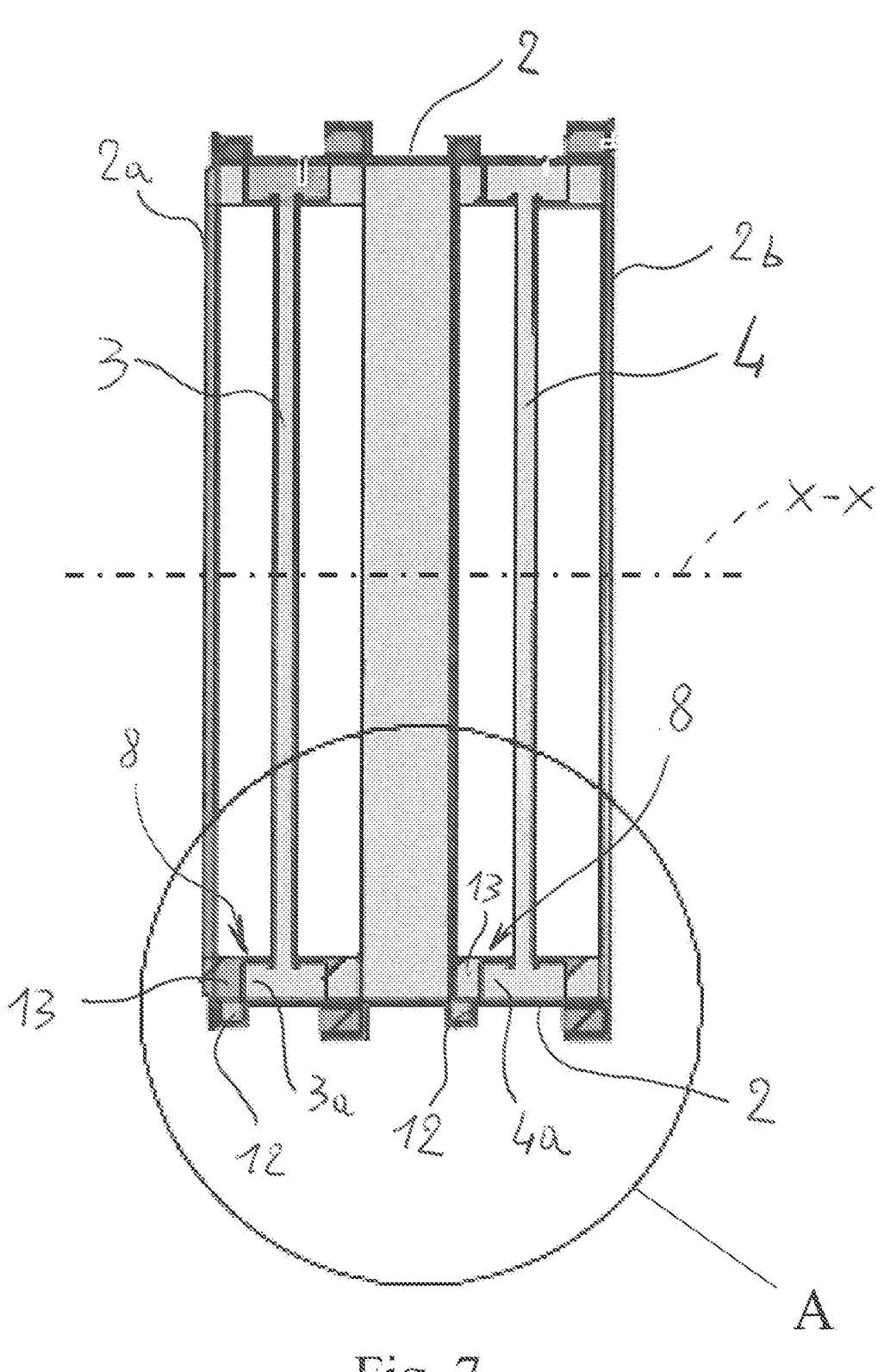
FIG. 7 shows a sectional view as taken along the line 7-7 of FIG. 4.
Figure 8:
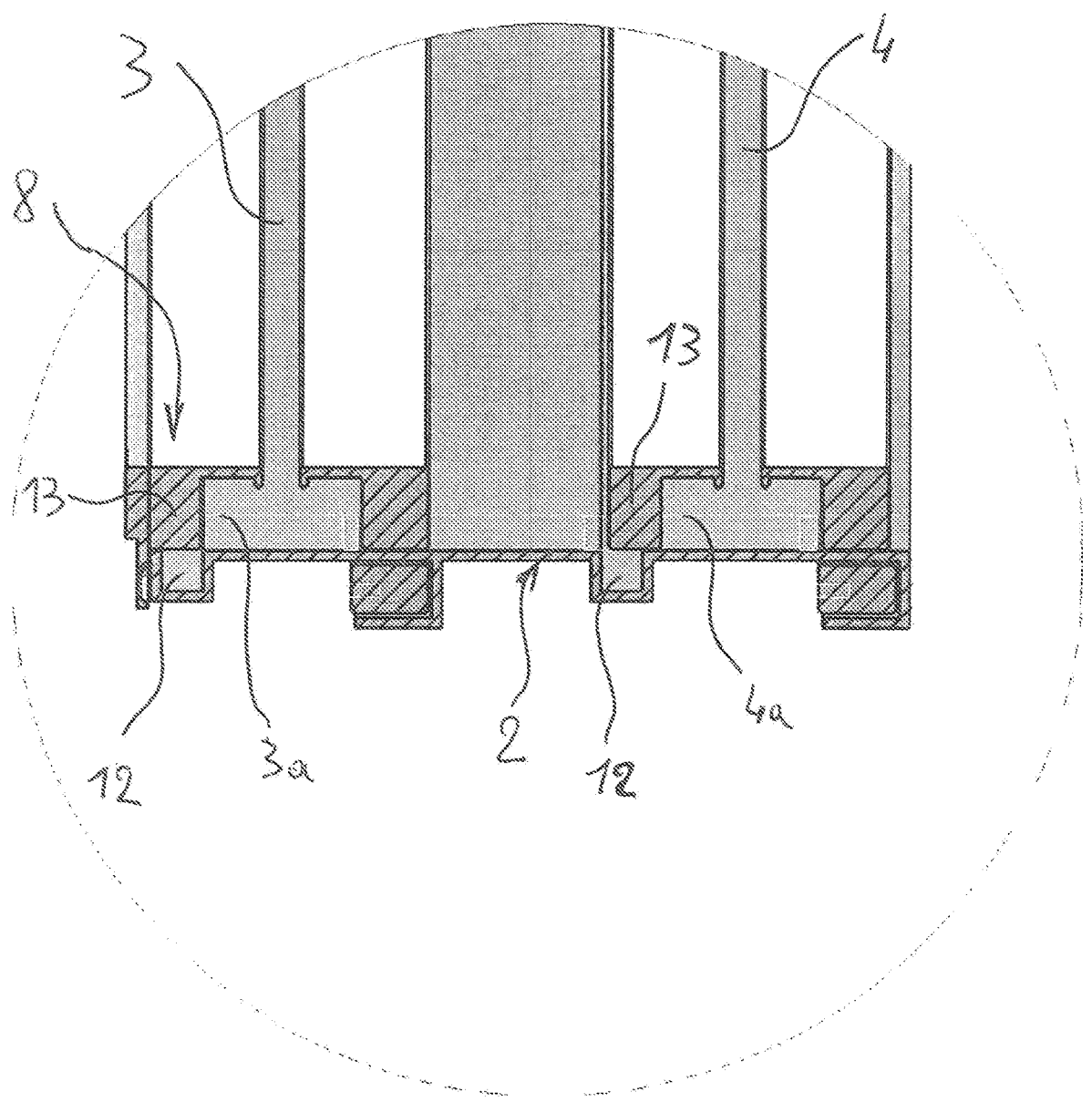
FIG. 8 shows an enlarged view of the detail in the circle A of FIG. 7.

According to the preferred illustrated embodiment (see FIGS. 7 and 8), the aforementioned releasable fixation means 8 comprise annular elements 13, namely fifth wheels 13, inserted in the cylindrical tubular element 2 to engage and retain the aforementioned first portion 3a, 4a of the closures 3, 4 against the interior surface of the side wall of the cylindrical tubular element 2. In particular, the aforementioned deformable and/or inflatable/deflatable hollow elements 12 act in the radial direction against the annular elements 13 to axially lock them in position within the cylindrical tubular element 2.

According to a different embodiment, not shown, the aforementioned seats accommodate at least a portion of the deformable and/or inflatable/deflatable hollow elements and at least part of the first portion of the closures, so that said at least a portion of said deformable and/or inflatable/deflatable elements within said seats will act upon said at least part of said first portion of said closures, thereby attaching it in the seat and ensuring fixation of the closure relative to the cylindrical tubular element.

Preferably, the aforementioned deformable and/or inflatable/deflating elements 12 are made of an elastomer.

Preferably, the aforementioned quick-release fixation means 8, namely the aforementioned deformable and/or inflatable/deflatable elements 12, comprise a tubular seal having a channel for blowing compressed air inside.

According to a preferred and advantageous embodiment, the aforementioned closures 3, 4 are diaphragm closures.

It will be appreciated from the foregoing that the interface device of the present invention, as well as the apparatus for holding and discharging drums of the present invention can fulfill the above-mentioned need and also obviate the prior art drawbacks as set out in the introduction hereof.

That is, the provision of the aforementioned quick-release fixation means affords quick and simple replacement of each closure, while avoiding long downtime and requiring no specially skilled operators.

Special benefits have been achieved from the embodiment in which the aforementioned quick-release fixation means are defined by an element that can be inflated/expanded by compressed air or another pressurized fluid, possibly a hydraulic fluid, such as a cylindrical tubular element, a tubular seal and the like.

In addition, the interface device and the apparatus for holding and discharging drums as described above are structurally simple, thereby affording long-term operation.

Those skilled in the art will obviously appreciate that a number of changes and variants may be made to what has been described hereinbefore, without departure from the scope of the invention, as defined in the following claims.

The invention claimed is:

1. An interface device for an apparatus for holding and discharging drums comprising:

a cylindrical tubular element extending along a predetermined longitudinal axis and having opposite open ends, respectively, a first end and a second end;

a first closure located proximate to said first end, and a second closure located proximate to said second end, wherein:

each of said first and second closures can be operated to reversibly move from a closed state to an open state in which it respectively shuts and clears a passage defined by the respective first and second ends, and each of said first and second closures comprises:

a respective first portion rigidly joined to said cylindrical tubular element by a releasable fixation means, to be removed from the cylindrical tubular element and replaced, and a respective second portion rigidly joined to an operating member to allow each operating member to actuate the first and second closures, respectively, between said closed and open states, wherein said releasable fixation means comprise quick-release fixation means selected from the group consisting of pneumatically, hydraulically and mechanically operated means.

2. The interface device as claimed in claim 1, wherein said quick-release fixation means comprise at least one:

elements that can be deformed and/or inflated/deflated by changes in pneumatic or hydraulic pressure, and elements that can be deformed or undergo changes in configurations or changes by deformation of parts or changes in configuration of mechanical parts that can be achieved using elastically deformable elements and/or mechanisms undergoing changes in the configuration of mechanical parts.

3. The interface device as claimed in claim 2, wherein said deformable and/or inflatable/deflatable elements comprise respective inflatable tubular elements, susceptible to reversibly move by inflation/deflation from a smaller-volume state to a larger-volume configuration in which the inflatable tubular elements directly or indirectly act upon said first portion of the respective closure to cause said first portion to be rigidly joined to said cylindrical tubular element.

4. The interface device as claimed in claim 3, wherein said seats accommodate at least a portion of said deformable and/or inflatable/deflatable hollow elements and at least part of said first portion of said first and second closures, so that at least a portion of said deformable and/or inflatable/deflatable hollow elements, in said seats, will act upon at least part of said first portion of said first and second closures, thereby fixing said first and second closures in position relative to said cylindrical tubular element.

5. The interface device as claimed in claim 2, wherein said releasable fixation means comprise annular elements inserted in said cylindrical tubular element to engage and retain said first portion of said first and second closures, and said deformable and/or inflatable/deflatable elements radially act against said annular elements to hold the annular elements in position inside said cylindrical tubular element.

6. The interface device as claimed in claim 2, wherein said deformable and/or inflatable/deflatable elements are made of an elastomeric material.

7. The interface device as claimed in claim 2, wherein said quick-release fixation means comprise a tubular seal having a channel for blowing compressed air inside.

8. The interface device as claimed in claim 1, comprising actuators selected from the group consisting of pneumatic, hydraulic and/or mechanical actuators to achieve the actuation of said quick-release fixation means.

9. The interface device as claimed in claim 1, wherein said quick-release fixation means comprise deformable and/or inflatable/deflatable hollow elements operable by a variation of internal pressure.

10. The interface device as claimed in claim 3, wherein said deformable and/or inflatable/deflatable hollow elements are at least partially accommodated in seats formed in an interior surface of a side wall of said cylindrical tubular element, and in said larger-volume configuration, said deformable and/or inflatable/deflatable hollow elements radially project toward a center of said cylindrical tubular element to cause the first portion of the respective closure to be rigidly joined to said cylindrical tubular element.

11. The interface device as claimed in claim 1, wherein said first and second closures are diaphragm closures.

12. An apparatus for holding and discharging drums, comprising an isolator, an interface device for loading/unloading drums and a coupling device with a loading point, wherein said interface device, for loading/unloading drums, is the interface device as claimed in claim 1.

13. The apparatus as claimed in claim 12, wherein:

said isolator has openings with gloves sealingly connected to a body of said isolator, and/or said coupling device has a loading point comprising a flange or a hatch, and said apparatus comprises a device for lifting and rotating the loading/unloading drums which is designed to load cylindrical drums into said interface device.

* * * * *